United States Patent
Kaszas-Savos et al.

(10) Patent No.: US 6,375,908 B1
(45) Date of Patent: Apr. 23, 2002

(54) PROCESS AND APPARATUS FOR RECOVERY OF RAW MATERIALS FROM WASTES RESIDUES

(76) Inventors: Melania Kaszas-Savos; Tiberiu Kaszas, both of Edt 45, Steinbach (AT), A-4594

( * ) Notice: Subject to any disclaimer, the term of this patent is extended or adjusted under 35 U.S.C. 154(b) by 0 days.

(21) Appl. No.: 09/429,533

(22) Filed: Oct. 28, 1999

Related U.S. Application Data

(63) Continuation of application No. PCT/IB98/00807, filed on Apr. 28, 1998.

(30) Foreign Application Priority Data

Apr. 28, 1997 (DE) .......................................... 197 17 688

(51) Int. Cl.[7] .............................................. B01D 53/64
(52) U.S. Cl. ........................... 423/210; 423/44; 423/59; 423/149; 423/215.5; 423/481; 423/522; 423/DIG. 18; 110/216; 110/219; 110/345; 110/346; 588/231; 588/234; 588/236
(58) Field of Search ................................. 588/231, 234, 588/236; 423/59, 215.5, DIG. 18, 210, 481, 522, 44, 149; 110/219, 346, 345, 216

(56) References Cited

U.S. PATENT DOCUMENTS

| | | | | |
|---|---|---|---|---|
| 3,869,386 A | * | 3/1975 | Izdebski | 210/53 |
| 3,968,756 A | | 7/1976 | Yamada | 110/12 |
| 4,036,753 A | * | 7/1977 | Majima et al. | 210/63 R |
| 4,086,319 A | * | 4/1978 | Jones | 423/53 |
| 5,309,850 A | * | 5/1994 | Downs et al. | 110/235 |
| 5,352,420 A | * | 10/1994 | Kurzinger et al. | 423/210 |
| 5,456,891 A | * | 10/1995 | Fattinger et al. | 423/210 |
| 5,612,008 A | * | 3/1997 | Kirk et al. | 423/60 |
| 5,653,182 A | * | 8/1997 | Sörvik | 110/250 |
| 5,967,965 A | * | 10/1999 | Vyshkina et al. | 588/256 |
| 5,972,301 A | * | 10/1999 | Linak et al. | 423/53 |

FOREIGN PATENT DOCUMENTS

| | | | | |
|---|---|---|---|---|
| DE | 2735812 A1 | * | 2/1979 | 423/215.5 |
| DE | 2935564 A1 | | 3/1981 | |
| DE | 3127499 C1 | | 3/1983 | |
| DE | 3514471 A1 | | 10/1986 | |
| DE | 9414534.2 U1 | | 12/1994 | |
| DE | 4333510 C1 | | 1/1995 | |
| GB | 1119134 | | 7/1968 | |
| GB | 2006177 A | | 5/1979 | |
| WO | 9105881 | | 5/1991 | |
| WO | WO 93/12842 | * | 7/1993 | 588/231 |
| WO | 9523317 | | 8/1995 | |

OTHER PUBLICATIONS

Abstract of JP —54–058973 Dec. 5, 1979, May 1979.
Abstract from Derwent Database for JP 52–097369 A, Aug. 1977.

* cited by examiner

*Primary Examiner*—Steven P. Griffin
*Assistant Examiner*—Timothy C. Vanoy
(74) *Attorney, Agent, or Firm*—Baker Botts LLP

(57) ABSTRACT

A process is disclosed for recovering raw materials, in particular heavy metals such as chromium, zinc, copper, lead, or nickel, by separation from waste and residues, wherein a liquid or viscous starting mixture and/or a starting mixture composed of crushed or ground components is first prepared. The invention is characterized in that the raw materials are separated by a thermochemical treatment. The liquid, viscous and/or solid starting mixture is first mixed with additives, depending on its composition, then subjected to a thermal treatment in an oven. The atmosphere in the oven flows through the starting mixture and the suspended materials thus generated as flakes or dust are conveyed out of the oven through a filter installation with several stages in which they are separated from the waste gas. The first filter is designed as a hot filter, after which the waste gas is cooled and after flowing through at least a second filter, pre-heated and then burnt at a high temperature. The process of the invention may be used, for example, to recover chromium (III) oxide from chromium-containing residues or zinc oxide from zinc-containing residues. Formation of chromium (III) oxide from chlorine-containing wastes occurs by formation and decomposition of chromyl chloride. Additives suitable for use in the invention may include those that comprise aluminum, aluminum oxide, iron, iron oxide, chlorine-containing material, sulfur-containing, milled plastics, granulated plastics, peroxides, silicon oxide, magnesium oxide or combinations thereof.

18 Claims, No Drawings

PROCESS AND APPARATUS FOR RECOVERY OF RAW MATERIALS FROM WASTES RESIDUES

This is a continuation of copending International application No. PCT/IB98/00807 filed Apr. 28. 1998.

The invention relates to a process for recovering raw materials from wastes and residues, in particular for recovering heavy metals, in which a liquid or paste-like feed mixture and/or a feed mixture comprising comminuted or milled constituents is first produced and the recovery of the raw materials from the feed mixture is carried out by means of a chemical-thermal treatment and the waste gases are conveyed from the furnace through a multistage filter unit, where the first filter in each case is configured as a hot filter and the waste gases are subsequently cooled and flow through at least one second filter, are preheated and are then burnt at a high temperature. The invention further relates to an apparatus for carrying out the process.

Production processes, particularly in the production of a wide variety of products, result in formation of wastes or production-related residues, usually in the form of mixtures containing heavy metals such as chromium, zinc, nickel, copper, lead, etc., often in combination with organic substances, with the proportion of chromium generally predominating.

The separation of these mixtures to recover valuable raw materials is desirable, but is very difficult because of the wide differences in the chemical properties of these mixtures. For example, chromium(VI) oxide or chromium(III) oxide ($Cr_2O_3$) or zinc can be present in the liquid, paste-like or solid comminuted or milled wastes or residues.

Since the recovery of the heavy metals is very complicated and comparatively uneconomical, wastes containing heavy metals are, for example in a physicochemical plant, treated in such a way that the harmful materials are reduced, i.e. made inert, in other words made difficult to leach. The filter cake obtained in this way can then be stored permanently in a repository for hazardous waste.

For example, a process for recovering chromium known from Bayer AG is operated in a high-concentration region and only certain solutions which have been formed in Bayer's own processes, which contain particular contaminants and which have been used as additives for processing chromium ores are used. Here, the heavy metals are brought from the liquid to the solid phase, i.e. the first step is a chemical treatment in which the highly concentrated chromium-containing wastes are precipitated to form sludges. After these sludges have been dried, the wastes can then be processed further in a metallurgical plant.

DR-A-3514471 discloses a process and an apparatus for separating arsenic from the hot waste gas formed in the metallurgical processing of arsenic-containing materials in melt processes. In this process, the waste gases, which contain arsenic-containing impurities or condensates and dusts containing valuable metals, are purified in a multistage filter unit. To achieve deposition of arsenic-free dusts of valuable metals, the waste gas is cooled immediately after the melt process and treated by addition of a reducing agent so that unstable arsenic-containing compounds are formed. As a result, the arsenic is kept in the gas phase in stable form and cannot deposit on the valuable-metal-containing dusts which are separated out in the hot gas filter.

The arsenic condensates are then separated off in a second, downstream cold filter.

However, such a process does not make it possible to recover heavy metals from waste and residues.

Furthermore, WO-A-91/05681 describes a process for recovering chromium from wastes by formation of water-soluble chromates. For this purpose, dried chromium-containing material is comminuted and heat-treated with addition of alkaline reactants and of oxidants in a closed chamber to which oxygen is supplied. The water-soluble chromates formed are subsequently rinsed out. However, this process is not suitable for producing dusts or flakes containing noble metals.

Finally, U.S. Pat. No. 3,968,756 describes a process for the incineration of chromium-containing sludge.

Otherwise, highly concentrated wastes are, in accordance with current strict environmental regulations, packed in containers or the like and preferably stored permanently in underground repositories.

In the case of slightly contaminated wastes which have a certain minimum calorific value, it is possible for them to be burnt in a waste incineration plant. However, the residues formed in the incineration, for example fly ash and slag, then have to be stored in repositories for hazardous waste because of the increased heavy metal content. In addition, the waste incineration plant has to be connected to a downstream afterburning plant in order to remove the pollutants, e.g. dioxin, formed in the first combustion of organic substances from the waste air. For this purpose, the afterburning plant has to be operated at a considerably higher temperature than the actual waste incineration plant. The disadvantage of this is that, as a result of the high temperature, the chromium(III) oxide produced in the first thermal treatment is converted back into readily soluble chromium(VI) oxide and can then even leave the plant in an uncontrolled fashion. A similar effect occurs in the case of zinc.

In exceptional cases, small amounts of the residues having a restricted composition can be used as additives in metallurgical plants after appropriate pretreatment.

These examples show that only an extremely small proportion of the valuable heavy metals is reused. The permanent storage of the major part of the heavy metals from residues and wastes in repositories for hazardous waste is the economically and ecologically least favourable variant.

It is an object of the invention to develop a process for recovering and separating raw materials from wastes and residues, which can be implemented using simple means operates very reliably and as far as possible forms no further wastes or residues and by means of which the residues and wastes which have already been stored in repositories can be reprocessed.

According to the invention, the separation of the raw materials is carried out in a process of the type mentioned at the outset by means of a chemical-thermal treatment in a furnace through which air flows, by first mixing, as a function of the composition, the liquid, paste-like and/or solid feed mixture with additives blowing it together with an oxidizing or reducing agent into the furnace. Subsequently, the feed mixture is subjected to the chemical-thermal treatment in the furnace by first mixing, as a function of their composition, the liquid, paste-like and/or solid feed mixture with additives, blowing the feed mixture together with an oxidizing or reducing agent into the furnace in which the furnace atmosphere flows at a predetermined flow velocity through the feed mixture at a predetermined temperature so as to form, as a function of the air composition and temperature, low-density flakes containing heavy metals which are conveyed by means of the air flow velocity established in the furnace through the filter unit.

Suitable additives are aluminium-, iron-, chlorine- or sulphur-containing materials, and also milled plastics or granulated plastics as reducing agents. For use in chromium-containing chamotte bricks, possible additives are aluminium oxide in a ceramic mix or iron oxide in the case of specific alloys.

The oxygen content, the rate of the chemical reaction and the density of the flakes formed are the most relevant process parameters and determine the necessary flow velocity in the furnace in the individual case. In addition, the flow velocity is dependent on the heavy metal to be recovered and also on whether a rotary tube furnace or a fluidized-bed furnace is used.

The thermal treatment is carried out in a reducing/oxidizing atmosphere at a temperature in the range from 350° C. to above 700° C. depending on the respective feed mixture. The furnace temperatures required in the individual case depend on whether heavy metals are to be recovered, on the composition of the feed mixture and on the end products which are to be obtained (mineralization temperature). Thus, in the case of chromium as chromium(III) oxide or oxidic mixtures, a furnace temperature of 500–900° C. is required. In the case of zinc oxide, the most favourable temperature is 550–1250° C. Furthermore, a reducing atmosphere is required for the recovery of chromium(III) oxide from chromium-containing residues and an oxidizing atmosphere is required for the recovery of zinc oxide from zinc-containing residues.

The temperature in the first filter is about 800° C. The waste gas passing through the first filter can then be cooled to about 200° C. before reaching the next filter.

The flue gas formed, which can contain $CO_2$, $SO_2$, $Cl_2$, etc., is, after filtration, treated further in a customary flue gas purification plant to recover hydrochloric acid and sulphuric acid.

In chlorine-free systems, chromium(III) oxide is formed via the decomposition of the chromium-containing materials and the reduction/oxidation of the chromium.

In the case of chlorine-containing systems, chromium (III) oxide is formed via the decomposition of the chromium- and chlorine-containing materials, the formation of chromyl chloride ($CrO_2Cl_2$), the decomposition of chromyl chloride and the formation of chromium(III) oxide.

The recovery of chromium as chromium(III) oxide from wastes having a complicated composition is carried out by extraction with chlorine, with chromyl chloride being formed as intermediate.

The process can be used for the recovery of any heavy metals such as chromium, zinc, copper, lead, nickel, etc., with only the process parameters having to be adapted accordingly.

The process of the invention can most readily be implemented using a thermal reactor for the chemical/thermal treatment of the raw materials, where a multistage filter unit is connected immediately downstream of the reactor and an afterburning chamber is connected downstream of the filter unit in the flow direction of the waste gases or is arranged downstream of the dust separation, wherein the thermal reactor is a rotary tube furnace or fluidized-bed furnace whose furnace temperature is, depending on the mineralization temperature of the end products to be produced, in the range from 350° C. to 1250° C., the temperature of the first filter of the multistage filter plant is about 800° C. and the second filter is operated at a temperature of about 200° C.

In order to avoid undesired chemical reactions in the filter unit, the separation of dust or the flakes is carried out in the first filter at the temperature of 800° C. and the flue gas or waste gas is cooled before reaching a further filter in order to prevent formation of chromium(VI) oxide again. As filter unit, it is possible to use all known filters, for example a cyclone or ceramic filter for high temperature (as first filter) or a textile filter for low temperatures (as second filter), with the waste gas being cooled to about 200° C. before reaching the textile filter.

For the combustion or decomposition of organic compounds, very high temperatures have to be reached in the afterburning chamber so that only nonhazardous substances such as $CO_2$, $NO_2$ or $SO_2$ leave the afterburning chamber. For this reason, it is advantageous to arrange a heating device between the filter unit and the afterburning chamber so that the necessary high temperature is achieved during the short residence time of the waste gases in the afterburning chamber.

The advantage of the process of the invention for recovering raw materials from wastes and residues is that the chemical-thermal treatment can be readily adapted to the different composition of the feedstocks by simply altering the process parameters and/or the composition of the additives. In addition, no further residues apart from the production-related wastes are formed. After the chemical-thermal treatment, only milling and sieving processes are necessary to prepare the recovered raw materials in the form of flakes having different particle sizes and densities for their further use, i.e. the recovered heavy metals are supplied to users in powder form.

Moreover, the process of the invention is very environmentally friendly since no environmentally damaging materials are formed at the end of the process or are released.

In the case of faulty batches, a repeated pass through the process can be provided. This becomes necessary, for example, in the event of an excessively high chromium(VI) content being found in the end product, i.e. in the flakes. In this case, another pass through the process can be carried out with addition of a reducing agent to ensure a product of acceptable quality.

The apparatus for carrying out the process of the invention is characterized in that a thermal reactor is provided for chemical-thermal treatment of the raw materials and in that a filter unit is connected immediately downstream of the reactor and an afterburning chamber is connected downstream of the filter unit in the flow direction of the waste gases or is arranged downstream of the dust separation.

The thermal reactor is preferably configured as a rotary tube furnace or fluidized-bed furnace, so as to ensure a sufficient residence time of the wastes and residues mixed with the additives in the thermal reactor.

Furthermore, the filter unit has a multistage configuration with a cooling device connected downstream of the first filter. To avoid undesired chemical reactions, the temperature of the first filter is about 800° C., i.e. the first filter is configured as a hot filter.

The second filter connected downstream of the first filter is configured as a textile filter and is operated at a temperature of about 200° C.

Since the waste gases leaving the second filter have a very low temperature, it is advantageous for a heating device for preheating the waste gases to be arranged between the filter unit and the afterburning chamber. This ensures that the waste gases reach the necessary high temperature in the afterburning chamber.

The invention is illustrated below by means of an illustrative embodiment.

The starting material used is, for example, a solution containing chromium(VI) oxide and having the following composition:

| | |
|---|---|
| $CrO_3$ | 100–250 g |
| $Cr_3^+$ | 20–40 g |
| Fe | 10–30 g |
| Al | 1–20 g |
| F | 1–5 g |
| Si | 1–2 g |
| $H_2SO_4$ | 1–10 g |

This starting material is mixed with an aluminium-containing solution or an aluminium hydroxide slurry in order to bind the fluorine as $AlF_3$ and at the same time to correct the formulation of the starting material. In addition, quartz sand or silicon-containing wastes are mixed in.

The feed mixture produced in this way is blown into a rotary tube furnace together with granulated plastic and is subjected to a thermal-chemical treatment in the furnace. For this purpose, a furnace temperature of from 750° C. to 800° C. and a reducing furnace atmosphere are set. The granulated plastic can comprise any plastics and serves as reducing agent to generate the necessary reducing atmosphere in the furnace.

In the rotary tube furnace, the furnace atmosphere flows through the blown-in mixture and the chromium(III) flakes which form are conveyed by the air flow into a downstream first dust filter. In this dust filter, the flakes are separated from the waste gas and subsequently cooled.

The first dust filter is operated at 800° C. This prevents undesired chemical reactions such as the oxidation of chromium(III) oxide to chromium(VI) oxide. Cooling of the dust filter is advantageous in the recovery of copper or nickel, while a filter temperature of about 800° C. is appropriate in the recovery of chromium, zinc or lead.

To ensure complete separation of the waste gases from the suspended materials (flakes, dust), a second dust filter in the form of a textile filter is connected downstream of the first dust filter. A cooling device is arranged between the two filters in order to cool the waste gases to about 200° C. before they reach the second filter.

After the waste air has passed through the dust filter, it is reheated and fed into an afterburning chamber in which organic constituents of the waste air, e.g. dioxin, are burnt to form nonhazardous substances such as $CO_2$, $NO_2$, $SO_2$.

After the combustion chamber, the flue gas formed in the combustion chamber, which may contain $CO_2$, $SO_2$, $Cl_2$, etc., is passed to a flue gas purification plant by means of which hydrochloric acid and sulphuric acid can then be recovered.

In the case of chlorine-containing systems, chromium (III)oxide is formed via an intermediate, namely chromyl chloride, which is first produced by decomposition of the chlorine- and chromium-containing materials and is subsequently decomposed into $Cl_2$ and $Cr_2O_3$.

The above-described process is suitable for recovering any heavy metals, for example chromium, zinc, copper, lead, nickel, etc., with only the process parameters needing to be altered.

The following residues are used in the process of the invention:

Main Materials:

These are the residues which contain the heavy metals for recovery. They are solutions, sludges or powders containing heavy metals which can be present in chemically bound or metallic form.

Additives:

These are firstly production materials, as residues, which in the chemical-thermal treatment have reducing properties (plastic in a chromium plant) or oxidizing properties (peroxides in a zinc oxide plant) and secondly auxiliaries which are necessary to correct the formulation. Examples of such auxiliaries are aluminium oxide, iron oxide, silicon oxide and magnesium oxide.

The apparatus for carrying out the process comprises a thermal reactor (rotary tube furnace or fluidized-bed furnace) for the chemical-thermal treatment of the raw materials and a multistage filter unit connected directly downstream of the reactor. The filter unit comprises a first hot filter (ceramic filter, cyclone) which is operated at about 800° C. and a downstream second filter (textile filter) which is operated at about 200° C. with a cooling device being arranged between the two filters.

The waste air outlet of the filter unit is connected to a customary afterburning chamber which can, if required, be connected to a flue gas purification plant. In order to achieve effective after-combustion, the waste air from the filter unit is preheated and fed into the afterburning chamber.

We claim:

1. Process for recovering heavy metals from wastes and residues comprising:
   providing a feed mixture comprising a heavy metal wherein the feed mixture is one selected from the group consisting of a liquid, a paste and a solid,
   mixing the feed mixture with at least one additive,
   chemically and thermally treating the mixed feed mixture at a temperature above 700° C. by blowing the mixed feed mixture into a rotary tube furnace or a fluidized-bed furnace and blowing a furnace atmosphere through the blown-in mixed feed mixture at a predetermined flow velocity and a predetermined temperature,
   forming waste gases,
   forming low density flakes including the heavy metals,
   conveying the flakes to a downstream filter unit comprising at least two filters, and
   depositing the flakes on at least one filter,
   wherein the first filter in the filter unit is about 800° C., the second filter in the filter unit is about 200° C., and a cooling device is located between the first and second filters.

2. Process according to claim 1 wherein at least one additive is selected from the group consisting of an oxidizing agent and a reducing agent.

3. Process according to claim 1 wherein the furnace atmosphere is one selected from the group consisting of a reducing atmosphere and an oxidizing atmosphere.

4. Process according to claim 1 wherein the feed mixture includes chromium oxide and is free of chlorine and wherein the flakes comprise chromium (III) oxide.

5. Process according to claim 1 wherein the additive is a reducing agent.

6. Process according to claim 5 wherein the additive is selected from the group consisting of milled plastic and granulated plastic.

7. Process according to claim 1 comprising forming low density flakes at a temperature of 750° C. to about 800° C.

8. A. Process according to claim 1 further comprising conveying the waste gas to an afterburning chamber located downstream of the filter unit, wherein a heating device is positioned between the filter unit and the afterburning chamber to heat the waste gas before the waste gas enters the afterburning chamber, and wherein a flue gas is formed in the afterburning chamber.

9. Process according to claim 8 further comprising conveying the flue gas to a gas purification plant located downstream of the afterburning chamber and recovering hydrochloric acid, sulfuric acid, or both.

10. Process according to claim 1 wherein the feed mixture comprises chromium and chlorine and the furnace atmosphere is a reducing atmosphere.

11. Process according to claim 10, wherein the chromium and chlorine are first decomposed into a chromyl chloride intermediate, and wherein the chromyl chloride intermediate is subsequently decomposed into chromium (III) oxide.

12. Process according to claim 1 wherein the feed mixture comprises chromium and fluorine and the furnace atmosphere is a reducing atmosphere.

13. Process according to claim 1 wherein the feed mixture comprises zinc and the furnace atmosphere is an oxidizing atmosphere.

14. Process according to claim 1, wherein the first filter is a cyclone or ceramic filter.

15. Process according to claim 1, wherein the second filter is a textile filter.

16. Process according to claim 1, wherein said at least one additive is selected from the group consisting of aluminum-containing materials, iron-containing materials, chlorine-containing materials, sulfur-containing materials, milled plastics, and granulated plastics.

17. Process for recovering copper or nickel from wastes and residues comprising:

providing a feed mixture comprising copper or nickel wherein the feed mixture is one selected from the group consisting of a liquid, a paste and a solid, mixing the feed mixture with at least one additive, chemically and thermally treating the mixed feed mixture at a temperature above 700° C. by blowing the mixed feed mixture into a rotary tube furnace or a fluidized-bed furnace and blowing a furnace atmosphere through the blown-in mixed feed mixture at a predetermined flow velocity and a predetermined temperature, forming waste gases, forming low density flakes including the copper or nickel, conveying the flakes and the waste gases to a downstream filter unit comprising at least two filters, and depositing the flakes on at least one filter, wherein the first filter in the filter unit is about 800° C., the second filter is about 200° C., and a cooling device is located between the first and second filters.

18. Process for recovering heavy metals from wastes and residues comprising:

providing a feed mixture comprising a heavy metal wherein the feed mixture is one selected from the group consisting of a liquid, a paste and a solid, mixing the feed mixture with at least one additive, chemically and thermally treating the mixed feed mixture at a temperature above 700° C. by blowing the mixed feed mixture into a rotary tube furnace or a fluidized-bed furnace and blowing a furnace atmosphere through the blown-in mixed feed mixture at a predetermined flow velocity and a predetermined temperature, forming waste gases, forming low density flakes including the heavy metals, conveying the flakes and the waste gases to a downstream filter unit comprising at least two filters, depositing the flakes on at least one filter, conveying the waste gas to a heating device positioned between the filter unit and an afterburning chamber, heating the waste gas to temperatures in excess of 200° C., conveying the heated waste gas to the afterburning chamber located downstream of the filter unit, forming a flue gas, conveying the flue gas to a gas purification plant located downstream of the afterburning chamber, and recovering hydrochloric and/or sulfuric acid, wherein the first filter in the filter unit is about 800° C., the second filter in the filter unit is about 200° C., and a cooling device is located between the first and second filters.

* * * * *

UNITED STATES PATENT AND TRADEMARK OFFICE
CERTIFICATE OF CORRECTION

PATENT NO. : 6,375,908 B1
DATED : April 23, 2002
INVENTOR(S) : Kaszas-Savos et al.

It is certified that error appears in the above-identified patent and that said Letters Patent is hereby corrected as shown below:

<u>Title page, Item [54] and Column 1, line 3,</u>
Title, "WASTES RESIDUES" should read -- WASTES AND RESIDUES --

Item [57], ABSTRACT,
Line 25, "material," should read -- materials, --; and "sulfur-containing," should read -- sulfur-containing materials, --

Signed and Sealed this

Fifth Day of November, 2002

*Attest:*

*Attesting Officer*

JAMES E. ROGAN
*Director of the United States Patent and Trademark Office*